United States Patent Office 3,269,369
Patented August 30, 1966

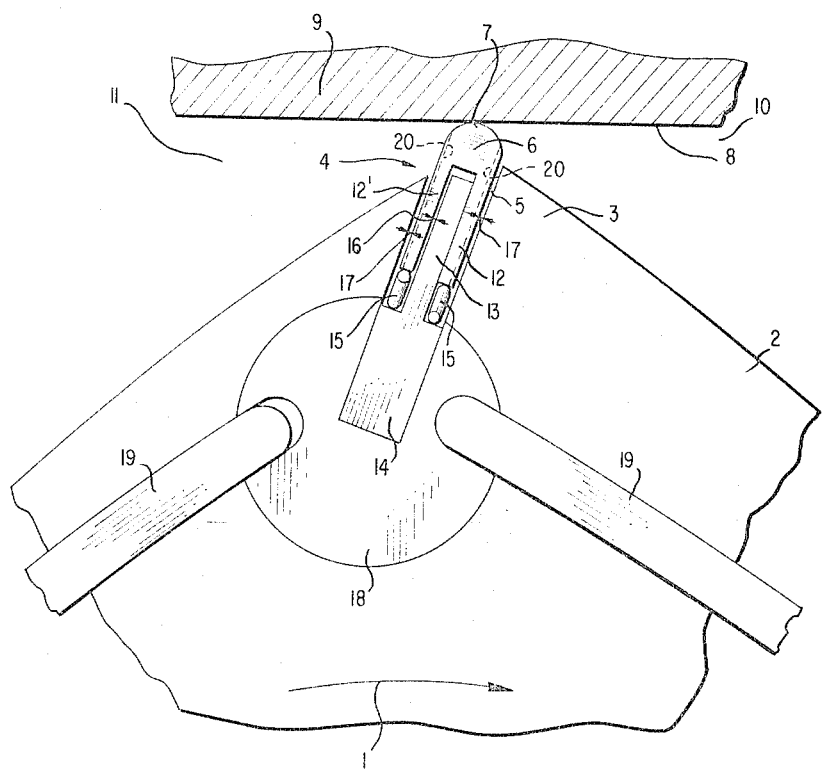

3,269,369
SEAL CONSTRUCTION
Richard Ehrhardt, Stuttgart-Unterturkheim, Germany, assignor to Daimler-Benz Aktiengesellschaft, Stuttgart-Unterturkheim, Germany
Filed July 17, 1963, Ser. No. 295,746
Claims priority, application Germany, July 24, 1962, D 39,443
13 Claims. (Cl. 123—8)

The present invention relates to a radial seal in rotary-piston internal combustion engines, especially of trochoidal constructions, which essentially consists of a sealing ledge member arranged within a groove extending parallelly to the axis of the piston and provided within a corner thereof, which sealing member is pressed radially outwardly by elastic means against the inner surfaces of the enclosure body.

The present invention aims at effectively reducing the lower surface of the sealing ledge member against which act the combustion gases which seek to displace the sealing ledge member radially outwardly in order to maintain the abutment force of the sealing ledge member against the inner surfaces of the enclosure body within certain limits. In solution of the underlying problem, the present invention essentially consists in constructing the sealing ledge member, as seen in cross section, of substantially U-shape with two leg portions adjoining the head portion of the sealing ledge member and by causing a guide part to engage between the leg portions which is arranged securely within the groove of the piston. The gases acting against one outer side of one leg portion of the sealing ledge member press this leg portion against the guide part so that only the lower surface of one leg portion of the sealing ledge member is available as engaging surface for the gases which seek to press the sealing ledge member radially outwardly. Since these lower surfaces can, in accordance with the present invention, be effectively made smaller by about one-half the size than the lower surfaces of a conventional prior art sealing ledge member, it is possible to reduce the abutment forces derived from the gas pressure also approximately by one-half.

Advantageously, the guide part may engage into the sealing ledge member in such a manner that the play between the outer side surfaces of the leg portions of the sealing ledge member and the flanks of the groove are twice as large as the play between the inner side-surfaces of the leg portions and the guide part because in this manner is achieved that in every case initially the inner side surface of a leg portion of the sealing ledge member comes into abutment against the guide part so that the path of the gases below the other leg portion of the sealing ledge member is blocked-off and the gas therefore, finds only a small engaging surface, namely the lower surface of one leg portion.

The guide part may be provided with a base portion which is pressed into the groove within the piston and against which are supported springs which, in turn press the sealing ledge member radially outwardly.

Additionally, relieve grooves may be arranged at the outer side surfaces of the leg portions of the sealing ledge member. These relieve grooves prevent that gases which by reason of the axial play of the sealing bolt reach below the sealing ledge member and below that leg portion of the sealing ledge member, which is not in abutment against the guide part, may build up a pressure.

Accordingly, it is an object of the present invention to provide a radial seal for rotary-piston internal combustion engines which eliminates, by a simple means and in an effective manner, the aforementioned shortcomings and inadequacies encountered with the prior art constructions.

It is another object of the present invention to provide a radial seal construction for rotary-piston internal combustion engines which permits, by extremely simple means, to maintain within certain limits the abutment forces which seek to press the seal members radially upwardly and which are derived from gas pressure of the engine.

Still another object of the present invention resides in the provision of a radial seal construction for rotary-piston internal combustion engines which enables a reduction of the abutment forces produced by the gases and acting on the seal in the radially outward direction.

Another object of the present invention resides in the provision of a radial seal in which means are provided to render ineffective those gases that may leak unintentionally below a certain part of the radial seal.

These and further objects, features and advantages of the present invention will become more obvious from the following description when taken in connection with the accompanying drawing which shows, in the single figure thereof, one embodiment in accordance with the present invention.

Referring now to the single figure of the drawing which shows a partial cross-sectional view through a rotary-piston internal combustion engine provided with a radial seal in accordance with the present invention, the piston 2 of the rotary-piston internal combustion engine of conventional construction which rotates in the direction of arrow 1 is provided along the corner 3 thereof with a radial seal generally designated by reference numeral 4. The radial seal essentially consists of the sealing ledge member 6 arranged within the groove 5 extending parallel to the axis of the piston; the sealing ledge member 6 abuts with the head portion 7 thereof against the inner surfaces 8 of the enclosure body 9 and thereby separates effectively the working chamber 10 from the working chamber 11 of the engine. The sealing ledge member 6 is of U-shaped construction and is provided with two leg portions 12 and 12'. A guide part 13 projects into the space between the two leg portions 12 and 12' which guide part 13 is pressed with the base portion 14 thereof into the groove 5 and therewith is firmly seated therein. The springs 15 abut against the base portion on both sides of the guide part 13 which press the leg portions 12 and 12' and therewith the sealing ledge member 6 with the head portion 7 thereof against the inner surfaces 8 of the enclosure body 9. The dimensions of the leg portions 12 and 12' of the guide part 13 and of the groove 5 are so selected that the total play 16 between the inner surfaces of the leg portions 12 and 12' and the guide part 13 is about one-half the total play 17 between the outer surfaces of the leg portions 12 and 12' and the flanks of the groove 5. Consequently, if a higher pressure prevails or exists within the working chamber 10 than within the working chamber 11, then the leg portion 12 of the sealing ledge member 6 is pressed with the inner surafecs thereof against the guide part 13 as shown in the drawing. As a result thereof, the gases with higher pressure cannot reach below the leg portion 12' of the sealing ledge member 6 but find as engaging surfaces, to press the sealing ledge member 6 against the inner surfaces 8, only the lower surface of the leg portion 12. If a higher pressure prevails within the working chamber 11 than within the working chamber 10, then the inner surface of the leg portion 12' abuts against the guide part 13 and prevents that the gases reach below the leg portion 12. Since the lower surfaces of the leg portions 12 and 12' are relatively small and since the abutment forces of the sealing ledge member 6 against the inner surfaces 8 of the enclosure body 9 are much smaller than would be the case if the gases would press or act against a uniformly large lower or bottom surface of the sealing ledge member, it is necessary to construct the springs 15 relatively strong in order to achieve that a seal is assured also when the sealing ledge member is acted upon by a relatively slight gas pressure.

The sealing bolt 18, which in conjunction with the sealing ledge member 6 and the sealing ledge portions 19 of the axial seal, effectively seals the piston corner 3, has play in its axial direction and may be displaced relative to the guide part 13 or the base portion 14 thereof. Since it is possible that by reason of the axial play of the sealing bolt 18 gases may reach below that leg portion of the sealing ledge member 6 which does not abut against the guide part 13 and since a pressure may build up thereat as a result thereof, which increases the abutment forces of the sealing ledge member 6, relieve grooves 20 are arranged at the outer side surfaces of the leg portions 12 and 12' which extend in each case from the lower surfaces or bottom surfaces up to the head portion 7. By the presence of these relieve grooves 20 a pressure equalization takes place so that for the abutment force, in addition to the force of springs 15, only the pressure is determinative which is exerted against the lower bottom surfaces of that leg portion 12 or 12' which abuts against the guide part 13.

While I have shown and described one embodiment in accordance with the present invention, it is understood that the same is not limited thereto, but is susceptible of numerous changes and modifications within the spirit and scope thereof as known to a person skilled in the art, and I therefore do not wish to be limited to the details shown and described herein, but intend to cover all such changes and modifications as are encompassed by the scope of the appended claims.

I claim:
1. A radial seal for rotary-piston internal combustion engines, especially of trochoidal construction having an enclosure body provided with inner surfaces and a piston rotating along said inner surfaces, comprising:
   groove means extending parallelly to the piston axis and provided within a corner of the piston,
   said groove means having substantially parallel groove side walls,
   sealing ledge means arranged within said groove means,
   elastic means normally urging said sealing ledge means radially outwardly against the inner surfaces of the enclosure body,
   said sealing ledge means being of approximately U-shaped construction including a head portion and two leg portions adjoining said head portion,
   each of said leg portions having leg side walls substantially parallel to said groove side walls,
   rigid guide means extending between said leg portions and mounted firmly within the groove means of the piston,
   said guide means having guide side walls substantially parallel to said groove side walls,
   the total distance, measured along a line perpendicular to said groove side walls, between each of said guide side walls and adjacent leg side walls being less than the total distance, measured along said line, between each of said groove side walls and adjacent leg side walls,
   and the distance, measured along said line, between one of said guide side walls and the adjacent leg side wall of one of said leg portions being less than the distance, measured along said line, between one of said groove side walls and the adjacent leg side wall of the other of said leg portions.

2. A radial seal for rotary-piston internal combustion engines, especially of trochoidal construction having an enclosure body provided with inner surfaces and a piston rotating along said inner surfaces, comprising:
   groove means extending parallelly to the piston axis and provided within a corner of the piston,
   sealing ledge means arranged within said groove means,
   elastic means normally urging said sealing ledge means radially outwardly against the inner surfaces of the enclosure body,
   said sealing ledge means being of approximately U-shaped construction including a head portion and two leg portions adjoining said head portion,
   and guide means extending between said leg portions and arranged firmly within the groove means of the piston,
   said guide means engaging said sealing ledge means in such a manner that the play between the outer side-surfaces of the leg portions of the sealing ledge means and the flanks of the groove means is about twice as large as the play between the inner side surfaces of the leg portions and the guide means.

3. A radial seal for rotary-piston internal combustion engines, especially of trochoidal construction having an enclosure body provided with inner surfaces and a piston rotating along said inner surfaces, comprising:
   groove means extending parallelly to the piston axis and provided within a corner of the piston,
   sealing ledge means arranged within said groove means,
   elastic means normally urging said sealing ledge means radially outwardly against the inner surfaces of the enclosure body,
   said sealing ledge means being of approximately U-shaped construction including a head portion and two leg portions adjoining said head portion,
   and guide means extending between said leg portions and arranged firmly within the groove means of the piston,
   said guide means being provided with a base portion pressed into the groove means within the piston, and said elastic means including springs supported against said base portion and pressing said sealing ledge means radially outwardly.

4. A radial seal for rotary-piston internal combustion engines, especially of trochoidal construction having an enclosure body provided with inner surfaces and a piston rotating along said inner surfaces, comprising:
   groove means extending parallelly to the piston axis and provided within a corner of the piston,
   said groove means having substantially parallel groove side walls,
   sealing ledge means arranged within said groove means,
   elastic means normally urging said sealing ledge means radially outwardly against the inner surfaces of the enclosure body,
   said sealing ledge means being of approximately U-shaped construction including a head portion and two leg portions adjoining said head portion,
   each of said leg portions having leg side walls substantially parallel to said groove side walls,
   and rigid guide means extending between said leg portions and mounted firmly within the groove means of the piston,
   said guide means having guide side walls substantially parallel to said groove side walls,
   relieve means provided at the outer side-surfaces of said sealing ledge means,
   the total distance, measured along a line perpendicular to said groove side walls, between each of said guide side walls and adjacent leg side walls being less than the total distance, measured along said line, between each of said groove side walls and adjacent leg side walls,
   and the distance, measured along said line, between one of said guide side walls and the adjacent leg side wall of one of said leg portions being less than the distance, measured along said line, between one of said groove side walls and the adjacent leg side wall of the other of said leg portions.

5. A radial seal for rotary-piston internal combustion engines, especially of trochoidal construction having an enclosure body provided with inner surfaces and a piston rotating along said inner surfaces, comprising:

groove means extending parallelly to the piston axis and provided within a corner of the piston, sealing ledge means arranged within said groove means, elastic means normally urging said sealing ledge means radially outwardly against the inner surfaces of the enclosure body, said sealing ledge means being of approximately U-shaped construction including a head portion and two leg portions adjoining said head portion, and guide means extending between said leg portions and arranged firmly within the groove means of the piston, said guide means engaging said sealing ledge means in such a manner that the play between the outer side-surfaces of the leg portions of the sealing ledge means and the flanks of the groove means is about twice as large as the play between the inner side surfaces of the leg portions and the guide means, said guide means being provided with a base portion pressed into the groove means within the piston, and said elastic means including springs supported against said base portion and pressing said sealing ledge means radially outwardly.

6. A radial seal for rotary-piston internal combustion engines, especially of trochoidal construction having an enclosure body provided with inner surfaces and a piston rotating along said inner surfaces, comprising:

groove means extending parallelly to the piston axis and provided within a corner of the piston, sealing ledge means arranged within said groove means, elastic means normally urging said sealing ledge means radially outwardly against the inner surfaces of the enclosure body, said sealing ledge means being of approximately U-shaped construction including a head portion and two leg portions adjoining said head portion, and guide means extending between said leg portions and arranged firmly within the groove means of the piston, said guide means engaging said sealing ledge means in such a manner that the play between the outer side-surfaces of the leg portions of the sealing ledge means and the flanks of the groove means is about twice as large as the play between the inner side surfaces of the leg portions and the guide means, and relieve means provided at the outer side-surfaces of said sealing ledge means.

7. A radial seal for rotary-piston internal combustion engines, especially of trochoidal construction having an enclosure body provided with inner surfaces and a piston rotating along said inner surfaces, comprising:

groove means extending parallelly to the piston axis and provided within a corner of the piston, sealing ledge means arranged within said groove means, elastic means normally urging said sealing ledge means radially outwardly against the inner surfaces of the enclosure body, said sealing ledge means being of approximately U-shaped construction including a head portion and two leg portions adjoining said head portion, and guide means extending between said leg portions and arranged firmly within the groove means of the piston, said guide means being provided with a base portion pressed into the groove means within the piston, and said elastic means including springs supported against said base portion and pressing said sealing ledge means radially outwardly, and relieve means provided at the outer side-surfaces of said sealing ledge means.

8. In a radial seal for rotary-piston internal combustion engines, especially of trochoidal construction, having an enclosure body with inner surfaces along which rotates a polygonal piston, which includes within a groove having substantially parallel groove side walls, extending parallelly to the axis and provided within the corner of a piston a sealing ledge pressed radially outwardly against the inner surfaces of the enclosure body by elastic means, the improvement essentially consisting of constructing said sealing ledge of approximately U-shape to provide a head portion and two leg portions having leg side walls substantially parallel to said groove side walls, and rigid guide means firmly seated within said groove and extending between said leg portions, said guide means having guide side walls substantially parallel to said groove side walls, the total distance, measured along a line perpendicular to said groove side walls, between each of said guide side walls and adjacent leg side walls being less than the total distance, measured along said line, between each of said groove side walls and adjacent leg side walls, and the distance, measured along said line, between one of said guide side walls and the adjacent leg side wall of one of said leg portions being less than the distance, measured along said line, between one of said groove side walls and the adjacent leg side wall of the other of said leg portions.

9. In a radial seal for rotary-piston internal combustion engines, especially of trochoidal construction, having an enclosure body with inner surfaces along which rotates a polygonal piston, which includes within a groove extending parallelly to the axis and provided within the corner of a piston a sealing ledge pressed radially outwardly against the inner surfaces of the enclosure body by elastic means, the improvement essentially consisting of constructing said sealing ledge of approximately U-shape to provide a head portion and two leg portions, and guide means firmly seated within said groove and extending between the leg portions, said guide means extending between the leg portions of said sealing ledge in such a manner that the play between the outer side-surfaces of the leg portions and the flanks of the grooves is about twice the play between the inner side surfaces of the leg portions and the guide means, said guide means being provided with a base portion pressed into the groove, and spring means supported against said base portion and normally urging said sealing ledge radially outwardly, and the outer side surfaces of said leg portions being provided with venting channels to relieve gas pressures that may build up inadvertently under a respective leg portion of the sealing ledge.

10. A sealing device comprising:

a rigid body portion having means forming an elongated channel with substantially parallel channel side walls and a rigid guide member extending substantially the length of said channel between said channel side walls, said guide member having guide side walls substantially parallel to said channel side walls;

a U-shaped sealing member including a head portion and two leg portions depending from said head portion, said sealing member being within and extending substantially the length of said channel with said guide member between said leg portions, each of said leg portions having leg side walls substantially parallel to said channel side walls;

the total distance, measured along a line perpendicular to said channel side walls, between each of said guide side walls and adjacent leg side walls being less than the total distance, measured along said line, between each of said channel side walls, and adjacent leg side walls;

and the distance, measured along said line, between one of said guide side walls and the adjacent leg side wall of one of said leg portions being less than the distance, measured along said line, between one of said channel side walls and the adjacent leg side wall of the other of said leg portions.

11. The device of claim 10, wherein said rigid body portion is a piston of a rotary-piston internal combustion engine.

12. The device of claim 11, wherein said channel extends substantially axially of said piston, and including a relief channel extending substantially radially in each of said leg side walls that is adjacent to one of said channel side walls.

13. The device of claim 11, wherein said channel extends substantially axially of said piston, and including relief channel means extending substantially radially of said piston and operable to conduct combustion gases substantially radially between each of said leg portions and adjacent channel side walls.

References Cited by the Examiner
UNITED STATES PATENTS

| | | |
|---|---|---|
| 710,212 | 9/1902 | Reynolds. |
| 2,880,045 | 3/1959 | Wankel _____ 123—8 X |
| 3,137,280 | 6/1964 | Jacobson et al. |
| 3,182,641 | 5/1965 | Lamm _____ 123—8 |
| 3,185,387 | 5/1965 | Paschke _____ 123—8 X |

MARK NEWMAN, *Primary Examiner.*

SAMUEL LEVINE, *Examiner.*

F. T. SADLER, *Assistant Examiner.*